US008478633B2

(12) United States Patent
Chang et al.

(10) Patent No.: US 8,478,633 B2
(45) Date of Patent: Jul. 2, 2013

(54) METHOD AND APPARATUS OF ON DEMAND BUSINESS ACTIVITY MANAGEMENT USING BUSINESS PERFORMANCE MANAGEMENT LOOPS

(75) Inventors: Hung-yang Chang, Scarsdale, NY (US); Shyh-Kwei Chen, Chappaqua, NY (US); Pawan Chowdhary, Croton on Hudson, NY (US); Jun-Jang Jeng, Armonk, NY (US); Liangzhao Zeng, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 11/944,617

(22) Filed: Nov. 24, 2007

(65) Prior Publication Data
US 2008/0071595 A1 Mar. 20, 2008

Related U.S. Application Data

(63) Continuation of application No. 10/994,246, filed on Nov. 23, 2004, now abandoned.

(51) Int. Cl.
*G06Q 10/00* (2012.01)
(52) U.S. Cl.
USPC .......................................................... 705/7.38
(58) Field of Classification Search
USPC .................................................. 705/7.11, 7.38
See application file for complete search history.

(56) References Cited

U.S. PATENT DOCUMENTS

| | | | |
|---|---|---|---|
| 5,321,812 A | 6/1994 | Benedict et al. | |
| 5,960,420 A | 9/1999 | Leymann et al. | |
| 6,041,306 A | 3/2000 | Du et al. | |
| 6,397,191 B1 | 5/2002 | Notani et al. | |
| 6,405,173 B1 | 6/2002 | Honarvar et al. | |
| 6,425,005 B1 | 7/2002 | Dugan et al. | |
| 6,430,545 B1 | 8/2002 | Honarvar et al. | |
| 6,567,783 B1 * | 5/2003 | Notani et al. | 705/7.26 |

(Continued)

OTHER PUBLICATIONS

Jeng, Jun-Jang et al., An Agent-based Architecture for Analyzing Business Processes of Real-Time Enterprises EDOC, 2003.*

(Continued)

*Primary Examiner* — Scott L Jarrett
(74) *Attorney, Agent, or Firm* — Whitham, Curtis, Christofferson & Cook, P.C.; Daniel P. Morris

(57) ABSTRACT

An architecture, system, and method are provided for a commitment loop solution for on demand business activity management. A Business Performance Management (BPM) loop is defined as a set of nodes each relating to different tasks for processing performance management trigger data generated by a business entity in real time, where the beginning or sensing element of the loop is triggered by a token (representing a business event from a business process) and the ending or executing element provides a business action to be implemented by the business entity. The token is passed from node to node sequentially in a particular order around the loop. Processing of the data represented by the token is governed by policies, which can be changed dynamically and follow a life cycle. On demand business activity management of larger aggregates of business entities (i.e. enterprises and value chains) is achieved by extending this architecture by building upon the BPM loops of the component entities to form a BPM net, adding nodes as necessary. This architecture, system and method can be implemented at multiple levels of granularity from operational or tactical business activities to enterprise wide strategic activities.

9 Claims, 11 Drawing Sheets

U.S. PATENT DOCUMENTS

| | | | |
|---|---|---|---|
| 6,694,362 | B1 | 2/2004 | Secor et al. |
| 6,751,509 | B2 | 6/2004 | Hirayama |
| 6,842,805 | B1 | 1/2005 | Hauck et al. |
| 6,862,573 | B2 | 3/2005 | Kendall et al. |
| 6,965,886 | B2 | 11/2005 | Govrin et al. |
| 7,028,303 | B2 * | 4/2006 | Lahey et al. .................. 718/106 |
| 7,240,324 | B2 * | 7/2007 | Casati et al. .................. 717/103 |
| 7,349,877 | B2 * | 3/2008 | Ballow et al. ............... 705/36 R |
| 7,383,240 | B2 * | 6/2008 | Mital et al. ....................... 706/47 |
| 7,389,335 | B2 * | 6/2008 | MacLeod et al. ............. 709/223 |
| 7,509,308 | B2 * | 3/2009 | Huang et al. ......................... 1/1 |
| 7,680,683 | B2 * | 3/2010 | Hilerio et al. ................ 705/7.27 |
| 7,769,807 | B2 * | 8/2010 | Childress et al. ............. 709/203 |
| 7,835,933 | B2 * | 11/2010 | Casati et al. ................. 705/7.12 |
| 2001/0032092 | A1 | 10/2001 | Calver |
| 2001/0049615 | A1 | 12/2001 | Wong et al. |
| 2002/0038217 | A1 | 3/2002 | Young et al. |
| 2002/0170035 | A1 * | 11/2002 | Casati et al. .................. 717/127 |
| 2002/0188643 | A1 | 12/2002 | Kennedy |
| 2003/0004736 | A1 | 1/2003 | Calderaro et al. |
| 2003/0018508 | A1 | 1/2003 | Schwanke |
| 2003/0023675 | A1 * | 1/2003 | Ouchi et al. .................. 709/203 |
| 2003/0105692 | A1 | 6/2003 | Gilbert et al. |
| 2003/0120593 | A1 | 6/2003 | Bansal et al. |
| 2003/0227392 | A1 | 12/2003 | Ebert et al. |
| 2004/0249832 | A1 | 12/2004 | Goldthorpe |
| 2005/0071266 | A1 | 3/2005 | Eder |
| 2005/0147119 | A1 | 7/2005 | Tofano |
| 2005/0160361 | A1 * | 7/2005 | Young ........................... 715/513 |
| 2005/0209732 | A1 | 9/2005 | Audimoolam et al. |
| 2006/0053039 | A1 * | 3/2006 | Gamarnik et al. ................ 705/7 |
| 2006/0111921 | A1 * | 5/2006 | Chang et al. ....................... 705/1 |
| 2007/0033570 | A1 * | 2/2007 | Kong ............................ 717/104 |
| 2007/0185746 | A1 * | 8/2007 | Chieu et al. ....................... 705/7 |
| 2007/0234277 | A1 * | 10/2007 | Lei et al. ....................... 717/104 |
| 2008/0071595 | A1 * | 3/2008 | Chang et al. ....................... 705/7 |
| 2009/0010271 | A1 * | 1/2009 | Bachmann et al. ........... 370/401 |

OTHER PUBLICATIONS

Jeng, Jun-Jang et al., BPSM: An Adaptive Platform for Managing Business Process Solutions Fifth International Conference on Electronic Commerce Research, ICECR-5, Oct. 2002.*

Jeng, Jun-Jang et al., Business Committments for Dynamic E-Business Solution Management: Concept and Specification in the Proceedings of 6th World MultiConference on Systemics, Cybernetics and Informatics (SCI), vol. VIII Concepts and Applications of Systemics, Cybernetics and Informatics II, p. 403-407, Jul. 14-18, 2002.*

Jeng, jun-Jang et al., Policy Driven Business Peformance Management IFIP International Federation for Imformation Procesing, DSOM, 2004.*

Jeng, Jun-Jang et al., A Policy Framework for Business Activity management Proceedings of the IEEE International Conference on E-Commerce, CEC'03, 2003.*

Damianou, Nicodemos C., A Policty Framework Management of Distributed Systems University of London, Feb. 2002.*

Ballard, Chuck eta l., Business Performance Management . . . Meets Business Intelligence IBM Redbooks, Jul. 2005.*

Zeng, Liangzhao et al., PLMflow—Dynamic Business Process Composition and Execution by Rule Inference TES 2002.*

Casati, Fabio, Models, Semantics, and Formal Methods for the design of Workflows and their Exceptions Politenico Di Milano, 1998.*

Jeng, Jun-Jang et al., COSAR: Commitment-Oriented "Sense and Respond" System for Microelectronic Manufacturing ACM 2003.*

Business actvitiy management: Your window of opportunity for better business operations IBM, Jul. 2003.*

Jeng, Jun-Jang et al., Towards Automatic Business Actvity Management IBM Watson Research Center, Unknown Date.*

Jeng, Jun-Jang et al., A policy framework for Web-Service based Business Activity Management Information Systems and e-Business Management, 2004.*

Lin, Grace et al., The Sense and Respnd Enterprise OR/MS Today, Apr. 2002.*

Kapoor, Shubir er al., Visual Analysis for Sense and Respond Enterprise IASTED International Conference on Software Engineering, 2004.*

Huang, Paul et al., A Sense and Respond Approach to Business Transformation Proceedings of the IEE Conference on E-Commerce Technology for Dynamic E-Business, 2004.*

Mehrotra et al. book "Elements of Artificial Neural Networks", 1997, Massachusetts Institute of Technology.

* cited by examiner

METHOD AND APPARATUS OF ON DEMAND BUSINESS ACTIVITY MANAGEMENT USING BUSINESS PERFORMANCE MANAGEMENT LOOPS

This application is a continuation of parent application Ser. No. 10/994,246 filed Nov. 23, 2004, now abandoned which is incorporated herein by reference.

BACKGROUND OF THE INVENTION

1. Field of the Invention

The present invention generally relates to business process management and, more particularly, to frameworks for business process management that facilitate adaptive monitoring and control.

2. Background Description

To succeed in today's business environment, an enterprise needs agility. Businesses must respond to changing customer needs with flexible systems and processes. Unfortunately, most enterprises are slow to respond to both the problems occurring in its organizations and the changes of requirements from customers. Static processes that cannot adapt to changing needs are a liability. Enterprises are scrutinizing the effectiveness of their business and information technology (IT) operations to identify opportunities for greater efficiencies.

Business performance management (BPM) has emerged as a critical discipline to enable enterprises to manage their business solutions in an "on-demand" fashion, that is, so that the business solution changes rapidly to accommodate changing demands in the marketplace. BPM applications are intended to promote an adaptive strategy by emphasizing the ability to monitor and control both business processes and the IT events that support these processes. In theory, by coordinating the business and IT events within an integrated framework, decision makers can quickly and efficiently align IT and human resources based on the current business climate and overall market conditions. Business executives can leverage the results of core business process execution to speed business transformation, and IT executives can leverage business views of the IT infrastructure to recommend IT-specific actions that can drive competitive advantage.

However, in practice most BPM processes and architectures are linear and rigid and are very hard to change once they have been developed and implemented. To change the requirements of these BPM systems is sometimes like building a completely new application, which costs time and money. Some enterprises attempt to increase the flexibility and agility of business processes by introducing dynamic workflows and intelligent rules. However, this kind of approach is hard to model, deploy and maintain. In the BPM domain, business analytics are commonly incorporated into business monitoring and management systems in order to understand business operations in a deeper sense. Nevertheless, most functions provided by business analytics are performed in batch mode, which compromises the ability of the management system to determine business situations and resolve exceptions in a timely fashion. It is challenging to run business analytics in a continuous manner. In general, it is extremely difficult to model, integrate and deploy monitoring and control capabilities into larger scale business solutions (e.g. supply chain management) so that the business process can be managed dynamically.

Current technologies for dynamically adapting IT systems to changes in the business environment, where the IT systems are serving an interrelated structure of business units, are inadequate in a number of particulars. There is no agreement on how monitoring and management capabilities should be defined and deployed to the customer's environment. Further, existing workflow models are process-centric, for reasons of efficiency and cost, but many business problems arising from changes in the business environment can be more easily solved using a mission-centric analysis, i.e. what an organization is obligated to do. Also, two-party service management based on service-level agreements (SLAs) cannot handle commitments crossing lines between business units in a complex organization. Finally, existing rule-based expert systems for decision support do not provide end-to-end reasoning for business commitments and capabilities.

There are several existing efforts directed toward the general problem area of adaptation to changing business conditions, but each of these efforts is deficient. An approach using the name "Ponder" provides a policy language for a distributed management system, but fails to consider modularized policies for different granularities and levels of abstraction in business process management. The Holosofx Monitor is based on time and cost only, and fails to provide a generic concept for business process management. There is no quality of service management of the wider value net within which a particular business process operates. A framework for specifying and monitoring Service Level Agreements for Web Services (WSLA) provides a web service based language to specify IT level service agreements, but there is no supporting and scalable infrastructure for handling monitoring and management capabilities.

SUMMARY OF THE INVENTION

It is therefore an object of the present invention to provide a set of modularized policies for business process management that are adaptable for different granularities and levels of abstraction within a complex business structure of interrelated business activtities.

Another object of the invention is to provide a supporting and scalable infrastructure for building monitoring and management capabilities at the business unit, enterprise, and value net levels.

It is also an object of the invention to provide an architectural framework for building business performance management (BPM) systems that overcomes the constraints of a currently available linear based design.

The present invention provides a policy based BPM framework to address the above issues. In general, a BPM system is a system for sensing stimuli in the business environment, interpreting perceived data to detect exceptions, determining alternatives for overcoming the exceptions, and deciding how to respond to the situation presented. A policy based BPM system using BPM loops establishes an on-demand platform for business performance monitoring and control. The central notion of this kind of BPM system is the BPM service. A BPM system having BPM loops manages multiple instances of a BPM service within a shared IT infrastructure. Each service is developed as either a Web service or a service on grid of servers. We define the BPM loop framework as delivering BPM services to multiple service customers over the Internet to form a shared service-oriented architecture. Each instance of a BPM service in this BPM loop architecture can be viewed as a utility computing service environment. A defining feature of a BPM loop framework in accordance with the invention is the sharing and management of highly heterogeneous resources with the constraint that user expectations will be satisfied from both functional and non-functional perspectives. Similarly, a policy based BPM loop system is able to integrate, monitor and control functions so that these functions are available to managers on a continuous basis.

The core of this modular and scalable invention is a system for business performance management of a business unit. The business unit is defined by business processes. The business processes generate events, which are detected by the BPM system (e.g. via probes) and represented by tokens. The central component of the system is a BPM loop comprising a plurality of nodes, including at least a sensing node for receipt via the tokens of event data corresponding to a business event, as well as an execution node for sending action data to a business unit to be implemented in response to the business event. The transformation of event data into action data by the nodes of a BPM loop is governed by policies. Each token is passed sequentially from node to node in a particular order around the BPM loop, beginning with the sensing node and ending with the execution node. Application of a policy at a node is triggered by the token. Another aspect of modularity is that each node comprises a data acquisition element for acquiring data from another node, a data processing element for transforming data in accordance with one of the policies, and a data output element for transmitting data to another node. A further aspect of the invention is that the tokens are handled in real time, beginning with receipt of event data at the said sensing node and continuing with transformation of the event data in accordance with policies as the token is passed from node to node around the BPM loop, and ending with the transformed action data being sent to the business unit. Yet another aspect of the invention is that the policies may be adapted dynamically, including removal or addition of nodes in response to changes in the business process or changes in monitoring and control objective pertaining to the business process.

Building upon the foregoing core features, BPM loops can be combined by driving the sensing node of an additional BPM loop with an event not from a business process but rather from the data output component of a node (not necessarily the execution node) in another BPM loop. The token functionality is the same. In this fashion it may be understood how a network of BPM loops may be established, BPM loop by BPM loop, so as to dynamically adapt and expand business performance management capabilities to multiple business units forming an enterprise and multiple enterprises forming a value chain, as demand may require, without having to remove the modular and adaptable BPM loops and policies from their respective business units in order to undertake a BPM re-development effort.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
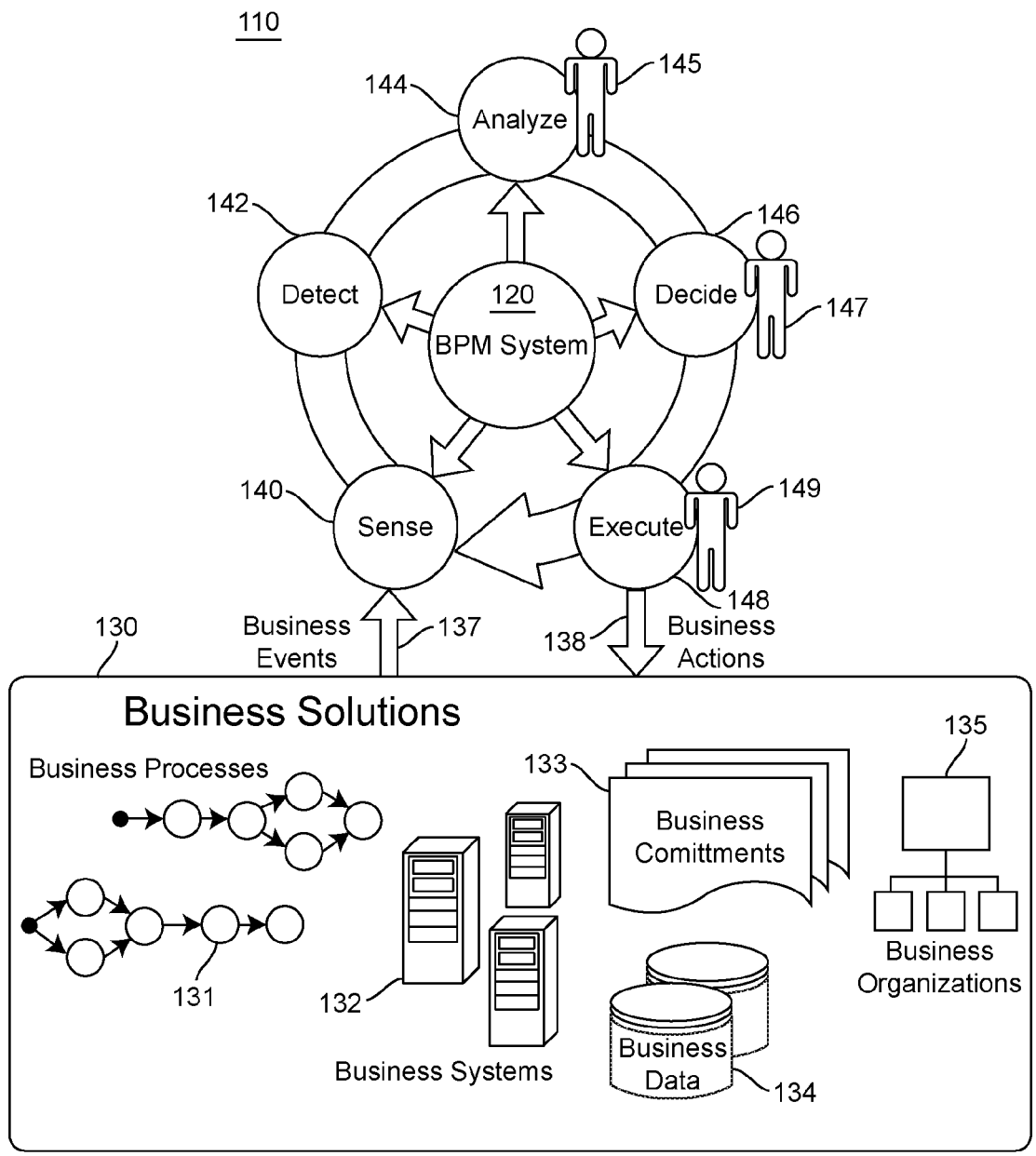
FIG. 1 is a diagram showing a business activity management cycle.

Referring now to the drawings, and more particularly to FIG. 1, there is shown a business activity management cycle or "BPM loop" 110. A policy based BPM loop structure for a BPM system 120 takes monitored data from target business solutions 130 (e.g. business events 137), invokes BPM services and renders business actions 138 back to target business solutions 130 in a continuous cycle. The business solutions 130 are characterized by one or more business processes 131, business IT systems 132, business commitments 133, business data sets 134, and business organizations 135. In general, there are five representative categories of services in a BPM loop structure 110 for a BPM system 120 according to the invention: Sense 140, Detect 142, Analyze 144, Decide 146 and Execute 148.

"Sense" 140 is the stage when a BPM system 120 interacts with business solutions 130 and provides data extraction, transformation, and loading capabilities for the sake of preparing qualified data that is to be further monitored and analyzed. This stage produces business metrics, e.g., the cycle time of a manufacturing process of supply chain management.

"Detect" 142 is the stage of detecting business situations and/or exception occurring in the business solutions 130. An example of situation detection could be lower-than-expected revenue performance in certain manufacturing process.

"Analyze" 144 is the stage when a BPM system 120 performs business analytics such as risk-based analysis for resolving business exceptions. The output of this stage often comes with recommendation of potential resolutions to decision makers 145. An example is a new set of build plans or modified inventory policies for the business process that is problematic.

"Decide" 146 is the stage when a decision maker will make a decision about how to respond to business situations. A decision maker 147 can be either a human being or a software agent. The mission of a BPM system 120 is to help decision makers 147 to make the right decision at the right time directed to the right targets.

"Execute" 148 is the stage when a BPM system 120 carries out actions for the purpose of enforcing the decisions made by decision makers 149. Actions can be of many forms. The simplest kind of action is alerting interested parties about the decisions. More complicated actions may involve sophisticated process invocation.

Example of the Preferred Embodiment

As an example for explaining how the invention works, we will now describe a BPM system for managing a business solution built for the IBM Microelectronics Division. It comprises a suite of event-driven, decision management applications that enable proactive management of business disruptions in real time. The BPM approach enables companies to resolve critical events within their business on an exception basis. It utilizes an event-driven solution management software infrastructure combined with advanced real-time analytics to monitor information sources and profile operational metrics, detect exceptions, send alerts, optimize business policies, and assess financial and operational risk. Information feedback from the operation of enterprise applications is critical to ensure visibility and control over the business processes enabled by such applications. For this system we provide application adapters that facilitate the collection of enterprise applications—from customer relationship management, to procurement, to advanced planning and scheduling, to the manufacturing floor. The volume of business events, such as a release of a purchase order, receipt of a sales order, shipment of a customer order, or the completion of a manufacturing lot, demand high levels of data integrity and transaction processing. This is fully supported by a flexible and extensible policy-driven software infrastructure.

The system's ability to identify potential out-of-tolerance situations—whether due to unexpected fluctuations in supply and demand, or emerging customer, partner, and supplier needs—is enabled by analytical exception detection agents. These agents utilize standardized or configurable measurements to observe business events; for example to ensure that enterprise revenue goals are being accomplished. The BPM policies are managed pro-actively. Alert messages inform business process owners in advance if a new trend is emerging and actions must be taken. Finally, this system provides a suite of domain-dependent optimization, performance prediction, and risk assessment agents that make exception management even more effective. The agents adopt existing cost structures and business process flexibility, and recommend optimized business policies and actions that drive business performance to higher levels of productivity, efficiency, and financial predictability.

An example of a typical use case for continuous demand-driven build plan and inventory optimization in the domain of microelectronic manufacturing can be described as follows. End-of-quarter revenue targets (per module family) are released/updated after the meetings among business line managers and executives. A business line manager has a pre-determined set of module families for which she has financial responsibility and, therefore, whose actual revenue (accumulated so far) and revenue outlook (for remaining weeks in the current quarter) she is interested in tracking against the revenue target of the current quarter. The actual demand, revenue, revenue outlook and inventory levels are key metrics for the business line managers for making adjustments in the manufacturing process. The following scenario illustrates how the business line manager utilizes the BPM system.

The BPM system receives events from various source systems from the supply chain. Some of these events impact the inventory levels or revenue metrics for the manufactured modules (such as "order placed" or "order cancelled" events). The BPM system continuously updates the actual revenue, the revenue outlook and inventory levels.

Whether the progression of the accrued revenue is normal or below target is determined by the BPM system using a wineglass model (see L. S. Y. Wu, J. R. M. Hosking, and J. M. Doll, "Business Planning Under Uncertainty: Will We Attain Our Goal?," IBM Research Report RC 16120, Sep. 24, 1990, Reissued with corrections Feb. 20, 2002). In the case where the revenue is below target, the system automatically detects such a situation and issues an alert showing the current sales quantities of some selected saleable part numbers in the nth week are out of their bands.

The BPM system recommends adjusting the planned demand quantities and safety stock requirements for the nth week. As a next step, it invokes a demand planning module and inventory planning module to analyze demand quantities and safety stock requirements for the nth week.

It further recommends altering the daily build plan in order to optimally match new daily demand statements—thus providing high serviceability—and minimize manufacturing and inventory costs. By doing so, it also shows the effects and risks of all suggested alternatives for changing the build plan.

Finally, the business line manager looks at the suggestions of the BPM system and makes a final decision for improving the build plan.

The BPM system immediately revises the actual build plan in the Enterprise Resource Planning (ERP) system (action) and continues the monitoring of the performance indicators with the up-dated build plan.

Defining BPM Policies

The policy driven management model is recognized as an appropriate model for managing distributed systems. This model has the advantages of enabling the automated management and facilitating the dynamic behaviors of a large scale distributed system. Policy works in conventional standards bodies focus more on defining frameworks for traditional IT systems. Minsky and Ungureanu ("Law-Governed Interaction: A Coordination and Control Mechanism for Heterogenous Distributed Systems," *ACM Transaction on Software Engineering and Methodology*, Vol. 9, No. 3, July, 2000, Pages 273-305) described a mechanism called law-governed interaction (LGI), which is designed to satisfy three principles: (1) coordination policy needs to be coordinated; (2) the enforcement needs to be decentralized; and (3) coordination policies need to be formulated. LGI uses decentralized controllers co-located with agents. The framework provides a coordination and control mechanism for a heterogeneous distributed system. Verma et al. [10] proposes a policy service for resource allocation in the Grid environment. Due to the nature of Grid computing, virtualization has been greatly used for defining policy services in the paper. However, in contrast to their work, the BPM is aimed for providing policy framework for business activities instead of a service for a system domain.

The implementation of network systems based on policies has been addressed through development of the Ponder language (which is a policy specification language) and various articles concerned with a policy framework for management of distributed systems. Traditional grid based frameworks for enterprise computing focus on distributed supercomputing, in which schedulers make decisions about where to perform computational tasks. Typically, schedulers are based on simple policies such as round-robin due to the lack of a feedback infrastructure reporting load conditions back to schedulers. However, the BPM system is governed by the BPM policies (BPM nets) that are a more sophisticated implementation of policy principles than is available under Open Grid Services Architecture (OGSA) policy.

The present invention is a framework aimed at dynamic composition of monitoring and control systems for business solutions. A BPM system is meant to be a platform for adaptive enterprise information systems in that the behavior of the system can be altered without modifying the mechanisms of the system itself. A BPM policy aims to govern and constrain the behavior of the BPM net and its constituent services. It usually provides policy rules for how the BPM system should behave in response to emergent situations. As an example, a policy for a supply chain inventory system may impose limits on the range of inventory levels for the manufacturing process based upon the revenue target of the enterprise. Relevant policies can be devised and applied to different aspects of business solutions. Examples include role-based authorization to manage target business solutions and resources, the scope of managed business solutions and resources, and service-level agreements.

Figure 2:
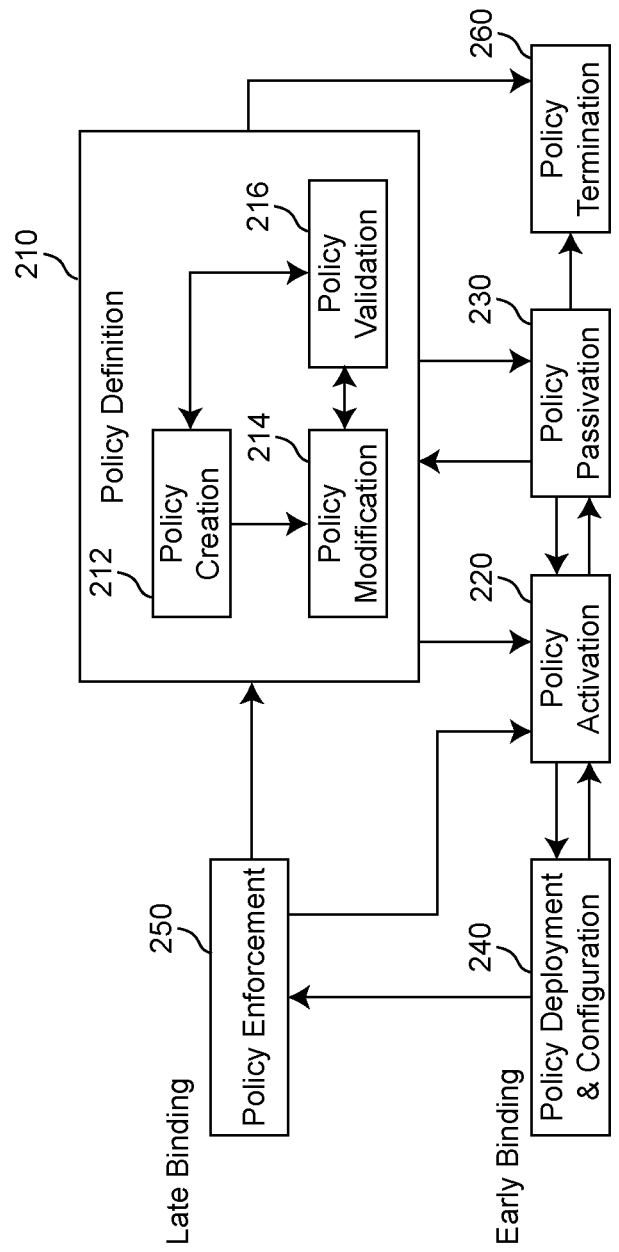
FIG. 2 is a diagram showing the life stages of a business policy life cycle.

Every BPM policy has its own lifecycle. The lifecycle of a policy consists of six basic life-stages as shown in FIG. 2. They are: policy definition 210, policy activation 220, policy passivation 230, policy deployment and configuration 240, policy enforcement 250 and policy termination 260.

Policy Definition 210 is the phase that a policy is created 212, modified 214 and validated 216. Corresponding definitional tools such as editors, browsers and policy verifiers can be used by business analysts to input the different policies that are to be effective in the BPM system.

The stage of Policy Deployment & Configuration 240 configures and deploys a policy into target system and configures the system correspondingly. A set of automated deployment & configuration utilities will usually simplify the tasks performed in this phase.

Policy Enforcement 250 is the stage when a policy is being enforced to govern and constrain the behavior of target systems. Monitoring and reporting tools enable policy makers to understand how the status of policy enforcement and whether the policy has been defined reasonably.

Policy Activation 220 is the phase when a policy is loaded into target system and waiting for further execution. In this phase, policies are active in the memory but have not been committed to any business activities yet.

Policy Passivation 230 is the phase when a policy is put to persistent storage without any active activity. For BPM, a policy repository is usually required as the placeholder for passivated policies.

Policy Termination 260 is the phase when a policy ceases to exist in the system.

Potentially, a policy can be bound to BPM services at two points of its lifecycle: (1) policy deployment & configuration 240: this type of binding is called early binding between policy and mechanism since it is realized at the build time; and (2) policy enforcement 250: this type of binding is, on the other hand, called late binding between policy and mechanism since this binding is realized at the run time when policy is being executed. A deployed (configured) policy can be un-deployed (un-configured) and rolled back to the policy activation phase. By the same token, an enforced policy can be de-enforced and transits back to the policy activation phase. As mentioned above, a business analyst can use monitoring tools to monitor the status of policy enforcement in the policy target. If she thinks the policy does not meet her business goals, she may stop the execution and transition the policy into the policy definition phase in order to modify that problematic policy.

The BPM policies are specified using Ponder-like expressions as follows. In this syntax, every word in bold is a token in the language and optional elements are specified within square brackets [ ]. The policy with name "policyName" will be triggered when the events specified in "event-specification" are generated and captured by the BPM system. The event can be primitive event and compound event what composed from primitive event using event operator. The keyword subject refers to the service that will act as the policy enforcer, and the scope phrase indicates the scope of application for this policy. The "do-when" pattern signifies the actions to be enforced based on the pre-defined constraints.

```
policy policyName[(<type> argName [, <type> argName]*)]
    on event-specification;
    subject [<type >] domain-Scope-Expression;
    [scope [<type >] domain-Scope-Expression;]
    do action-list;
    [when constraint-Expression ;]
```

The following segment shows the policy of detecting the out-of-bound revenue situation based on (a) given upper- and lower-bounds; and (b) predicted revenue performance. A metric event carrying the context object of the MDSAR system (noted as MDSARContext) acts as an input to this policy. Some of the data referred by this policy are parameterized as input parameters: (1) upperBound is the upper bound of the revenue performance; (2) lowerBound is the lower bound of the revenue performance; (3) ActionPlanningService indicates the service to receive the detected situation; (4) LOBManager is the manager who will get notified when the situation is eventually detected. Note that the upper and lower bounds for the revenue metric are derived by the wineglass algorithm. A policy can be devised to define how and when to invoke this algorithm. The when clause specifies the condition when the out-ofbound revenue situation (OutOfBoundRevenueSituation) will be raised. The do clause indicates that, when the situation occurs, alerts need to be sent to both LOB Manager and the action planning service.

```
policy senseOutOfBoundRevenueSituation(
        int upperBound,
            int lowerBound,
            ActionPlanningService aps,
            LOBManager lob)
        on MetricEvent(MDSARContext context);
    subject PolicyManager;         // the policy controller
target SituationDetectionService; // the policy enforcer
do {
    // notify action planning service
    notify(aps, "OutOfBoundRevenue Situation", context);
    // notify LOB manager
    notify(lob, "OutOfBoundRevenueSituation", context);
}
// situation detection rule
when context.revenue > upperBound∨context.revenue < lowerBound ;
```

The following policy shows what actually needs to be done when the aforementioned situation occurs. This policy is triggered by a situation event carrying the MD context object MDSARContext. The do clause defines an action by concatenating three other actions: (1) invoke the demand planning service to create a demand plan based on input situation object; (2) invoke the inventory planning service to create an inventory plan based on the demand plan; (3) notify the LOB manager about the recommended inventory plan. The execution strategy (as an input parameter) is DO_ALL_IN_SEQUENCE meaning every action indicated in do clause needs to be executed with indicated sequence.

```
policy respondOutOfBoundRevenueSituation(
    DemandPlanningService dps,
    InventoryPlanningService ips,
    LOBManager lob,
    ExecutionStraegy DO_ALL_IN_SEQUENCE)
    on SituationEvent(MDSARContext context);
subject PolicyManager;
target ActionPlanningService;
do {
    // invoke demand planning service
    demandPlan = invoke(dps, demandPlan, context);
    // invoke inventory planning service
    inventoryPlan = invoke(ips, demandPlan, context);
    notify(lob, inventoryPlan, context); // notify LOB manager
}
```

A couple of roles can participate in the action course of a BPM system: A data provider supplies required data based on the monitoring requirements of a BPM system. Examples include raw data, system-level metrics or business-level key performance indicators (KPIs). A service provider maintains an aggregation of BPM resources that can be allocated to different services. A service consumer monitors the metrics, gets alerts of business situations, and takes actions based on decisions made by decision makers that can be either humans or software agents. The scope of monitoring and control for a service consumer depends on the fine-grained definition of a service consumer. For example, a business executive will be more interested in balance scorecard statistics rather than system performance metrics. A policy maker provides monitoring and control policies that are used to govern the behavior of a BPM system. An example of policy maker is a business analysts working for an electronic manufacturing company with the goal of maximizing the performance of its supply chains. A system administrator takes BPM policies and maps them into system properties through configuration facilities of one or more console. Such mappings can be fulfilled either manually or automatically.

We have adopted a layered approach to defining BPM policies. There are at least four layers of abstraction to classifying BPM policies, which are described as follows.

The strategic BPM policy model defines the business goals and objectives in the form of balanced scorecards representing a quantification of goals, and measurable objectives. A balanced scorecard expressing each perspective as a combination of objectives initiatives, measure and target will indicate how well this model is performing.

The operational BPM policy model, typically developed by operation executives in collaboration with strategy executives, describes the process in business terms, policies, and metrics which get mapped to the scorecard for comparison with their strategic targets. Key Performance Indicators are directly linked to the measures that indicate progress on Balanced Scorecard goals in the Strategic model.

An operational BPM policy model would be transformed into an execution BPM policy model which defines how the business operation is executed in terms of specific applications, data sources, people and partners. It does not assume a particular implementation, allowing iterative performance improvement while assuring consistency with the business objectives.

Finally, some development may be required to connect an execution BPM policy model to a platform-specific BPM policy model whereas an example can be the policy of defining the heap size of the target operating system.

Policy Architecture

This section shows a realization of policy-driven BPM architecture. Two fundamental notions are presented here: BPM loop and BPM net.

BPM Loops

Figure 3:
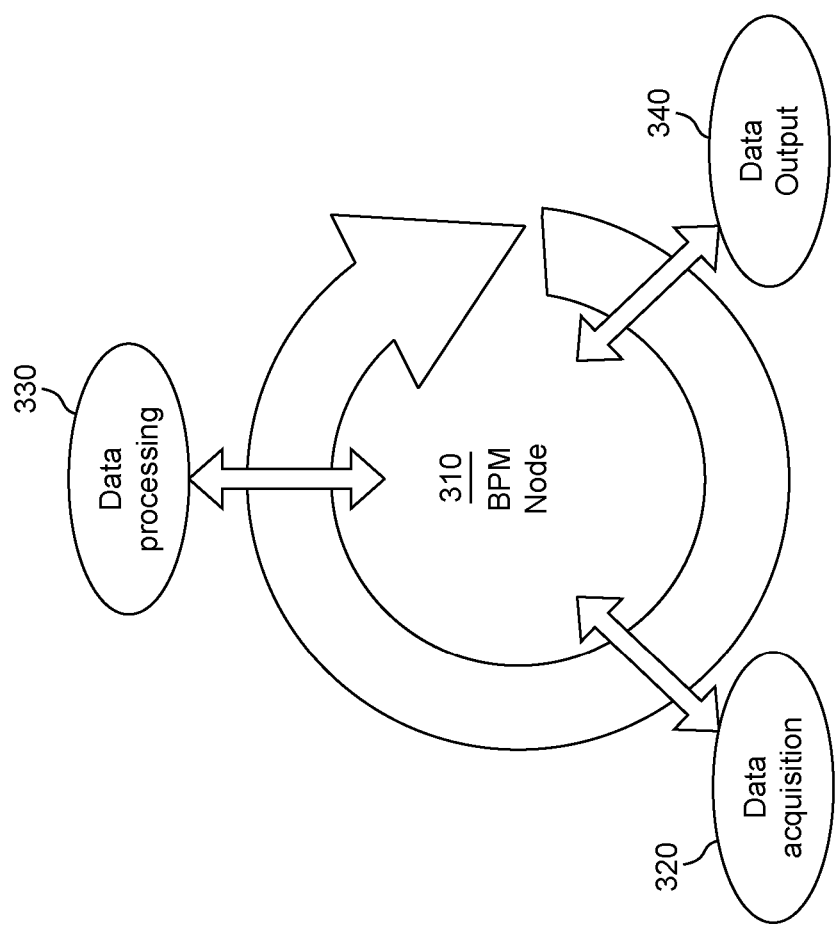
FIG. 3 is a schematic of a business performance management node.
Figure 4:
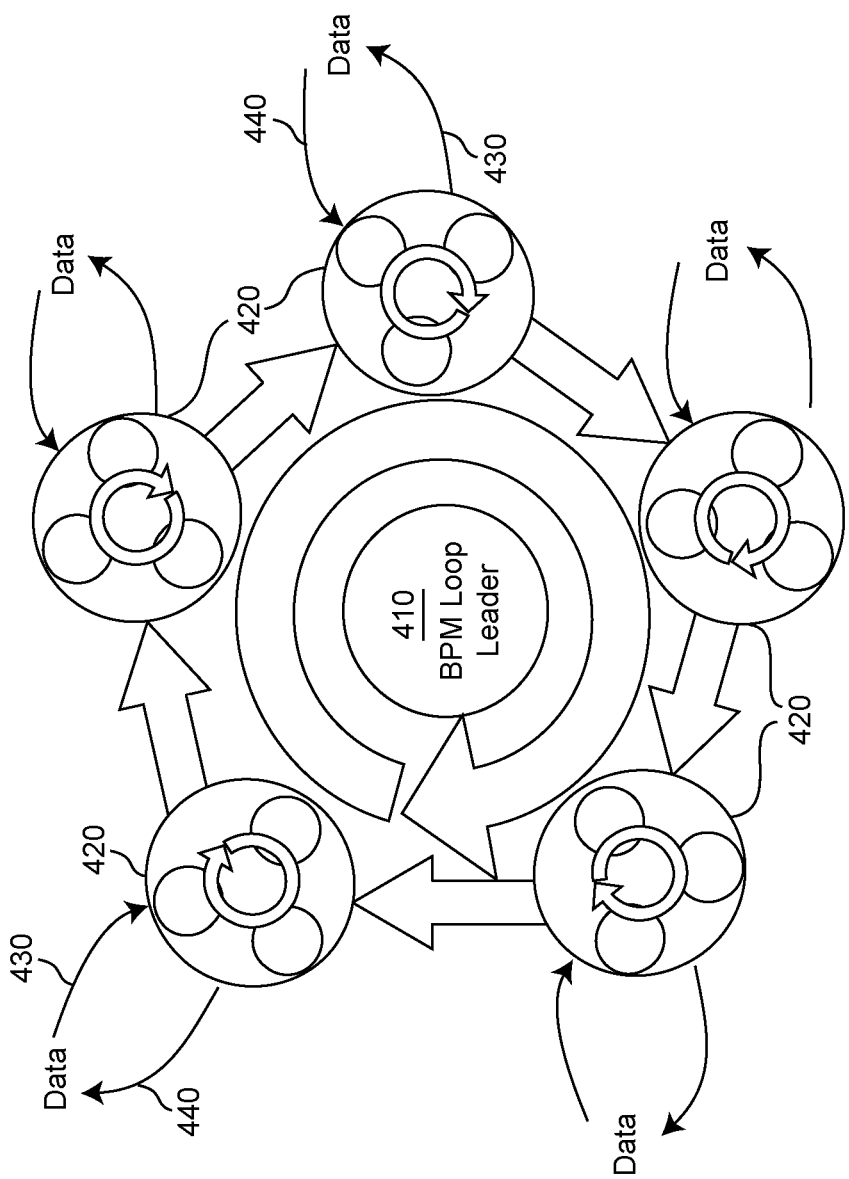
FIG. 4 is a schematic showing a BPM loop composed of BPM nodes.

The BPM cycle is realized in a BPM loop. A BPM loop represents a scalable mechanism of realizing real-time BPM capabilities at various levels of granularity (e.g. business organization, enterprise, value-net). A BPM loop consists of nodes and links. As shown in FIG. 3, a BPM node 310 is a basic service that enables transformation from input data acquired by a data acquisition 320 function and then transformed by a data processing 330 function based on its capabilities and the pre-defined policies and finally output by a data output 340 function. These BPM nodes 310 can be seen in FIG. 4 as nodes 420 coordinated by a node 410 designated as a BPM loop leader. The data acquisition 320 function is shown in FIG. 4 as data input 430, and data output function 340 is shown in FIG. 4 as data output 440.

A BPM link transmits data with specific types from one node to another node. A BPM node can have multiple instances of input and output links. Therefore, it can process multiple input requests concurrently. The number of BPM nodes in a BPM loop is subject to the actual requirements. BPM loops are policy-driven and dynamic. The BPM policy as described above is used to govern the information exchange and control signaling among BPM nodes. BPM loops can be used as a simple modeling vehicle of integrating BPM capabilities at various organizational levels, e.g., strategic, operational and execution.

BPM loops provide the means of building highly configurable and adaptive integration platform for BPM solutions. In our example, we have come up with five typical BPM service nodes in a BPM loop: (1) event processing service that takes raw data and produce qualified data to be further processed; (2) metric generation service that receives the qualified data and produced metrics; (3) situation detection service that analyzes incoming metrics and raise situations if needed; (4) action planning service that is triggered by situations and creates an action plan in order to resolve the situation; and (5) action rendering service that takes a group of actions from action planning service and actually renders them to the target business solutions. A BPM service node can process multiple input data requests based on the functionality to which it is aimed. Each service realizes a grid specification and is developed upon OGSA code base.

As implemented, the BPM loop architecture is a physical star and a data processing ring. The BPM loop nodes are connected to a dispatching module called a Multi Node Access Unit (MNAU). Normally several MNAUs are connected in one BPM node while BPM links connect those MNAUs to the BPM nodes. This makes up the physical star. The control flow is rendered from one BPM node to the other through the MNAUs and each connected BPM links. The control flows of the BPM loop are realized by control tokens. Each token represents a business event from a business process. Each BPM node on a BPM loop acts as both a data trans-former and a repeater, receiving a series of data from one node and passing them on to the next. During this transformation/repeating process, if a loop node notices that it is the destination of the control flow (coded in the token), each data is copied into the BPM data repository and the final data stream is altered slightly to let other nodes in the BPM loop know that the control token was received. The control token is sent to each loop node in a specific order, known as the loop order. This loop order never changes unless another loop node joins or leaves the loop. Once the token reaches the last node in the loop, it is sent back to the first node. This method of token passing allows each node to view the token and regenerate it along the way.

A BPM node is triggered when it receives a control token. This token gives the loop node permission to transform and transmit data. If there are more than one token residing within a BPM node, they will be queued up in local repository and will be processed in a first-come-first-serve fashion. However, some preemptive policies can be defined. One node on the network is the leader, and makes sure that the loop operates properly. This leader is called the BPM loop Leader. It performs several important functions including control token timing, making sure that control tokens and data don't circle the loop endlessly, and other maintenance duties. All nodes have the built-in capability to be the BPM loop Leader, and when there is no monitor on a loop, all the BPM nodes use special procedures to select one.

BPM Nets

Figure 5:
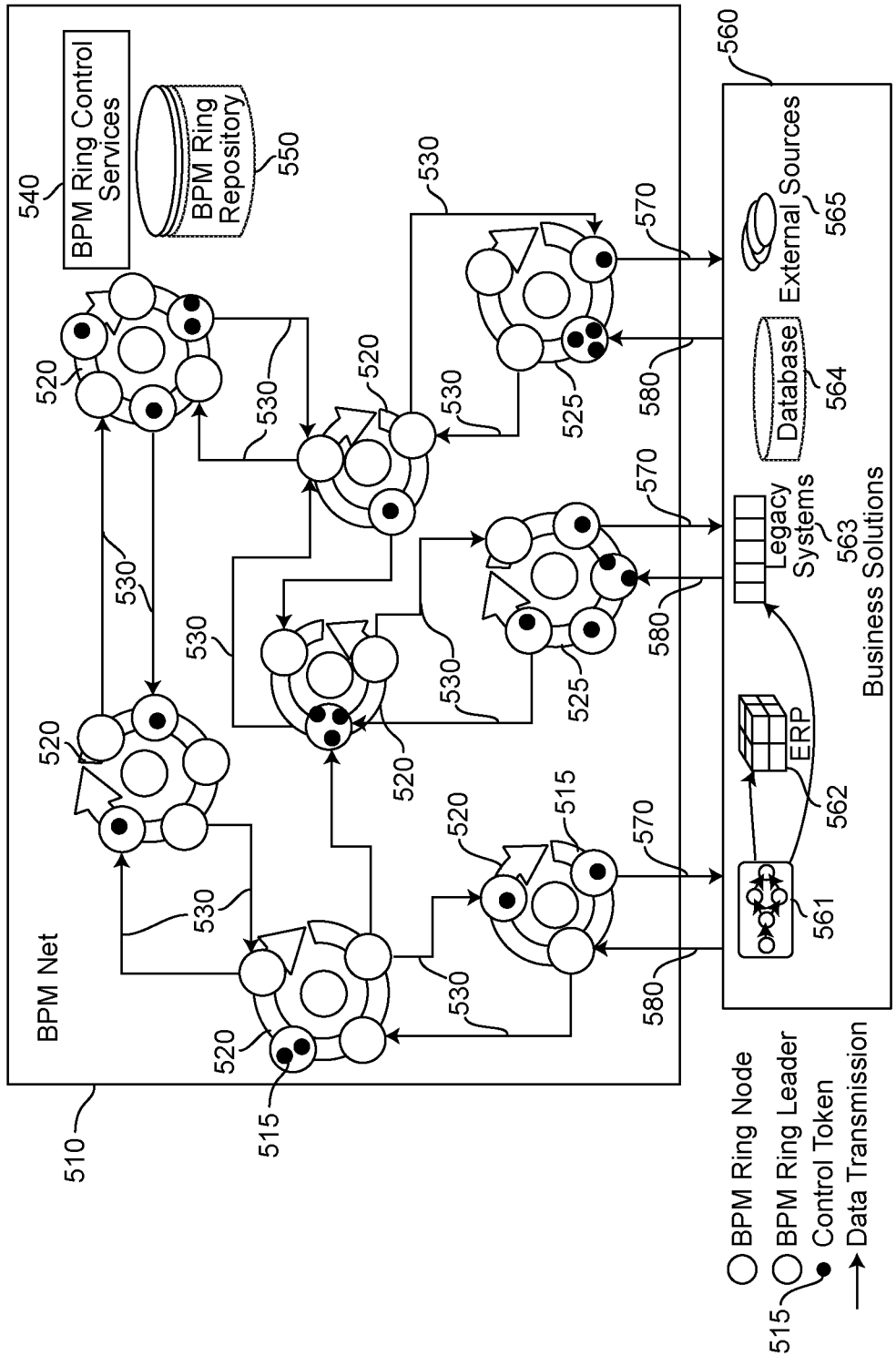
FIG. 5 is a schematic showing a BPM Net composed of BPM loops.

As shown in FIG. 5, multiple BPM loops 520 and 525 form a BPM net 510 for performance management of business solutions 560, which is composed of business processes 561, database 564, external sources 565, and possibly including legacy systems 563. Each BPM loop 520/525 becomes a node and interactions among BPM loops 520 and 525 constitute the links 530. While BPM loops capture the monitoring and control patterns of specific business situations (or exceptions) in the execution of business processes 561, BPM net represents the pattern of communicating autonomous BPM loops in order to capture a global behavior of monitoring and control across business solutions 560.

It should be noted that not all BPM loops 520 obtain business event input 580 from business solutions 560 and provide business action output 570 to business solutions 560. This is analogous to the situation described for a BPM loop in FIG. 1, where the sense node 140 receives business events 137 from business solutions 130 and the execute node 148 provides business actions 138 to business solutions 130. From the point of view of performance management of the broader aggregation of business entities and solutions represented by BPM net 510, the relevant "business events" and "business actions" will be responsive to the management needs of the aggregate. Some of these needs may be satisfied by existing BPM loops 520 for business processes associated with components of the aggregate, while others may require new BPM loops 525. BPM net 510 will have BPM loop control services 540, analogous to the loop control function of the BPM loop leader 410 shown in FIG. 4, as well as a BPM loop repository 550 for data and policies peculiar to the BPM net 510.

Figure 7:
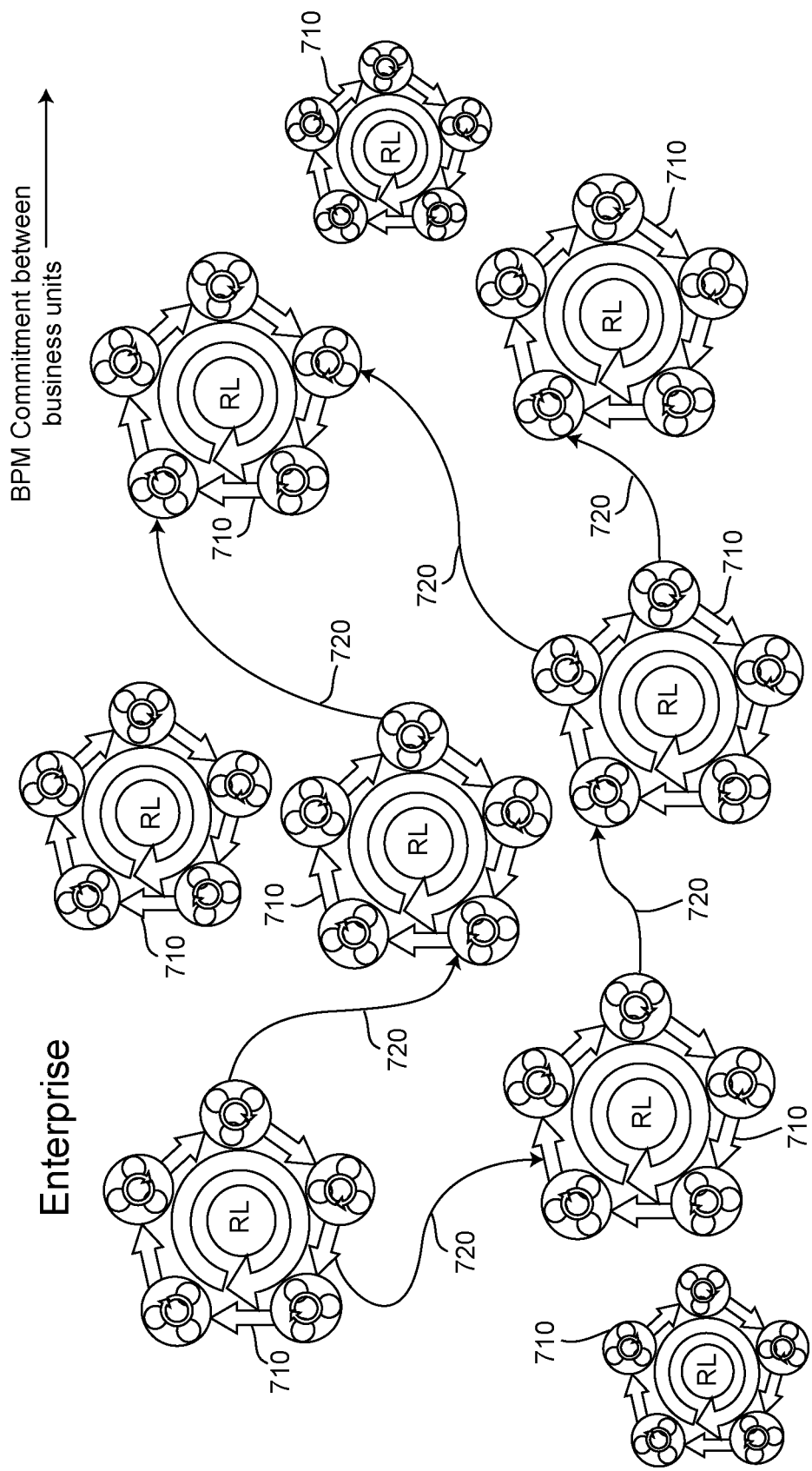
FIG. 7 is a diagram showing BPM loops connected by commitment links to form an enterprise.
Figure 8:
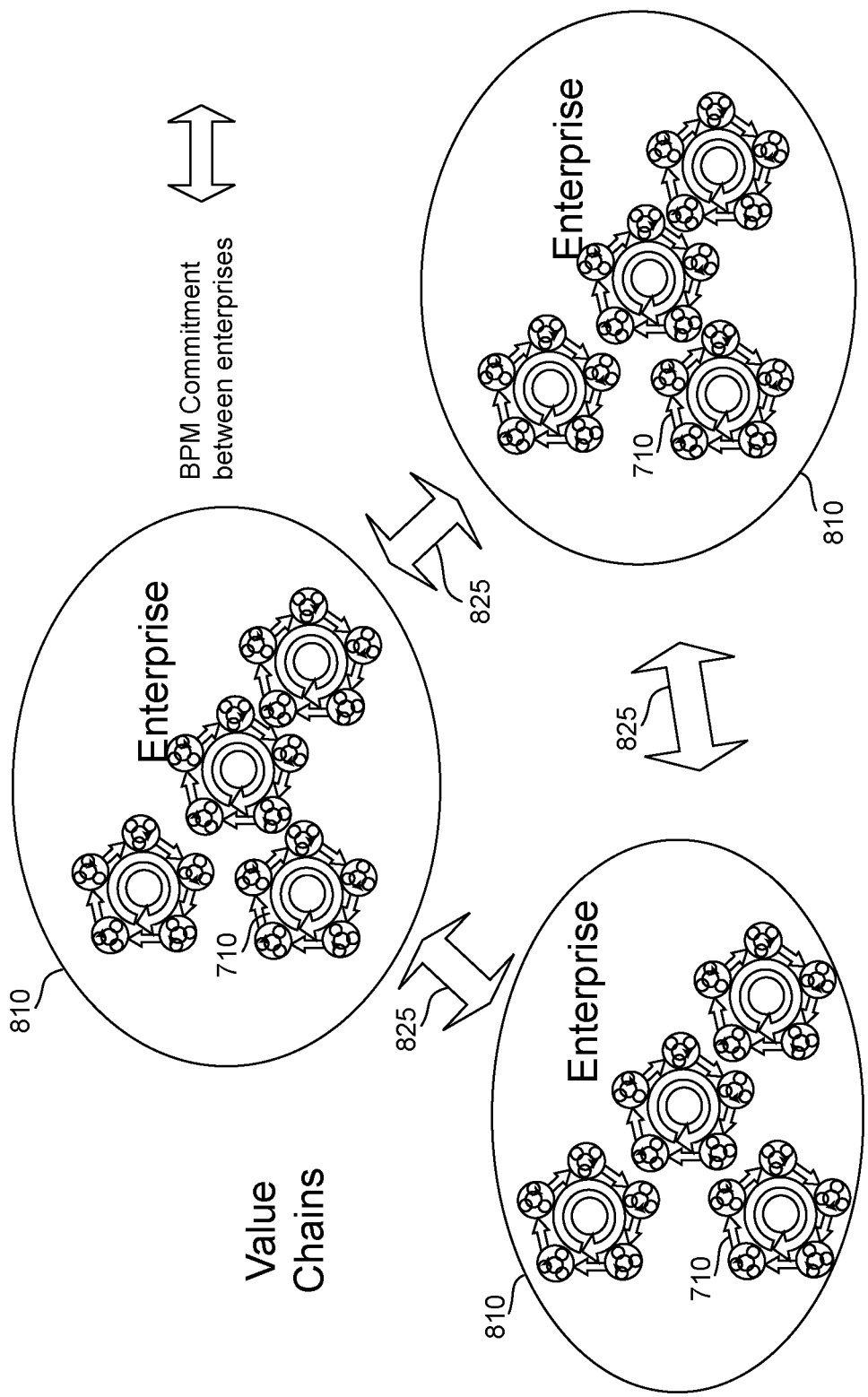
FIG. 8 is a diagram showing enterprises connected by commitment links to form a value chain.

Hence, a BPM net realizes the development of BPM capabilities for a business organization (enterprise), thereby improving Enterprise Resource Planning (ERP) 562. BPM loops collaborate with one another (as shown by links 530) and aggregate into higher granularities, as demonstrated in BPMnet 510 and in the commitment links 720 between business unit BPM loops 710 shown in FIG. 7. The structure of BPM nets can be further extended to represent contractual bindings between business organizations (enterprises) 810 as shown in FIG. 8, and typically result in information exchange between business organizations (enterprises) and consequent commitment links 825.

Formal BPM Net Model

A key goal of BPM net is to provide ubiquitous BPM services for target business solutions. Furthermore, the BPM net is a dynamic and open environment where the availability and state of these services and resources are constantly changing. The primary focus of the BPM net model disclosed in this invention is to automatically create BPM policies (when possible) from the set of available services (as described above in connection with FIG. 1) to satisfy dynamically defined monitoring and control objectives, policies and constraints. In the BPM net model, BPM services and policies can be dynamically defined. The pool of currently available BPM services is represented as a graph where the node represents services and the links can be modeled as potential interactions.

To define BPM net, we need to define the relation, called subsumption, among BPM loops. For two messages $M_1$ and $M_2$, we define that $M_1$ is subsumed by $M_2$, (noted by $M_1 \sqsubseteq M_2$), if and only if for every argument a in the output message of $M_1$, there is always an argument b in the input message of $M_2$ such that either they have the same type or the type of a is the subtype of the type of b. Formally, $M_1 \sqsubseteq M_2 \Leftrightarrow \forall M_1 \cdot \text{Output\_Arg} \ (\exists b \in M_2 \cdot \text{Input\_Arg s.t. (type(a)} = \text{type(b))} \lor \text{subtype(a,b)})$.

Similarly, for two services $S_1$ and $S_2$, we say that $S_1$ is subsumed by $S_2$ if for every message $M_1$ in $S_1$, there is a message $M_2$ such that $M_1$ is subsumed by $M_2$. Formally, $S_1 \sqsubseteq S_2 \Leftrightarrow \forall M_1 \in S_1 (\exists M_2 \in S_2 \text{ s.t. } M_1 \sqsubseteq M_2)$.

The formal definitions of BPM loop and BPM net are as follows:

1) A BPM loop $R_k = (S_k, C_k)$ where, $S_k$ is a set of service nodes and $C_k$ a set of service connections.
   a) Service set $S_k = \{S_{k,1}, S_{k,2}, \ldots S_{k,nk}\}$ where $n_k$ is the number of functional stages in the loop $R_k$;
   b) Connection set $C_k = \{C_{k,1,2}, C_{k,2,3}, \ldots, C_{k,nk-1,nk}\}$ where $c_{k,i-1,i}$ connects $s_{k,i-1}$ and $s_{k,i}$. The data output of $s_{k,i-1}$ is the input of $c_{k,i-1,i}$ and the input of $s_{k,i}$ is the output of $c_{k,i-1,i}$.

2) A BPM net is a structure based on a service graph N(B, Ó, Ö) where B is the business solution that the BPM Net monitors and controls, Ó a set of BPM loops, and Ö a set of potential interactions among loops.
   a) The target business solutions B={P, E} where P is set of probes that emit monitored data to BPM net and E a set of effectors that receives control directives from the BPM net.
   b) The set of loops Ó={$R_i$} where each of $R_i$ is associated with an order set of contextual data {Context($R_i$)}.
   c) The set of potential interactions among loops Ö={$L_{(i,x),(j,y)}$} such that $R_i, R_j \in R$ and x-th service of $R_i$ connects to y-th service of $R_j$. Each connection is associated with a utility function to calculate the cost value Cost($L_{(i,x),(j,y)}$).

3) In the net graph, N(B, Ó, Ö), the available services are nodes and interactions are edges. The edges {$L_{(i,x),(j,y)}$} are created at runtime when one of the following conditions hold
   a) Both $S_{(i,x)}$ and $S_{(j,y)}$ belong to the same loop, i.e., i=j and y=x+1.
   b) $S_{(i,x)}$ is subsumed by $S_{(j,y)}$, i.e., $S_{i,x} \sqsubseteq S_{j,y}$ 4) The initial service $S_0$ of the ultimate BPM net is the service that can consume the output generated by the probes of the business solution P, hence, $S_0 \sqsubseteq P$.

5) The final service $S_f$ of the of the ultimate BPM net is the service that produces the output to be consumed by the effectors of the business solution E, hence, $E \sqsubseteq S_f$.

6) The chosen services from BPM net at run time form an execution path {$S_0, S'_1, S'_2, \ldots, S_f$} in N(B, Ó, Ö)

7) The costs of $S_0$ and $S_f$ represent the costs of instrumentation of the target business solution. Assume the total cost of monitoring and controlling business solution B is con strained by a given value CostBound then we have the following relation for the final execution path:

$$\text{Cost}(S_{initial}) + \text{Cost}(S_{final}) + \sum_{i=1}^{n} \text{Cost}(S'_i) \le CostBound$$

The subsumption relationships among services can be used to generate candidate BPM services for the ultimate BPM net. The constraints among services are given by the users including the total execution cost of monitoring and controlling target business solutions. We single out the cost of the instrumentation of target business solution, which make it ready to be monitored and controlled by BPM net because of the high variability of such cost for different solutions. For the BPM net, the candidate execution paths can be generated from $S_0$ to $S_f$.

BPM Net Capabilities

Figure 6:
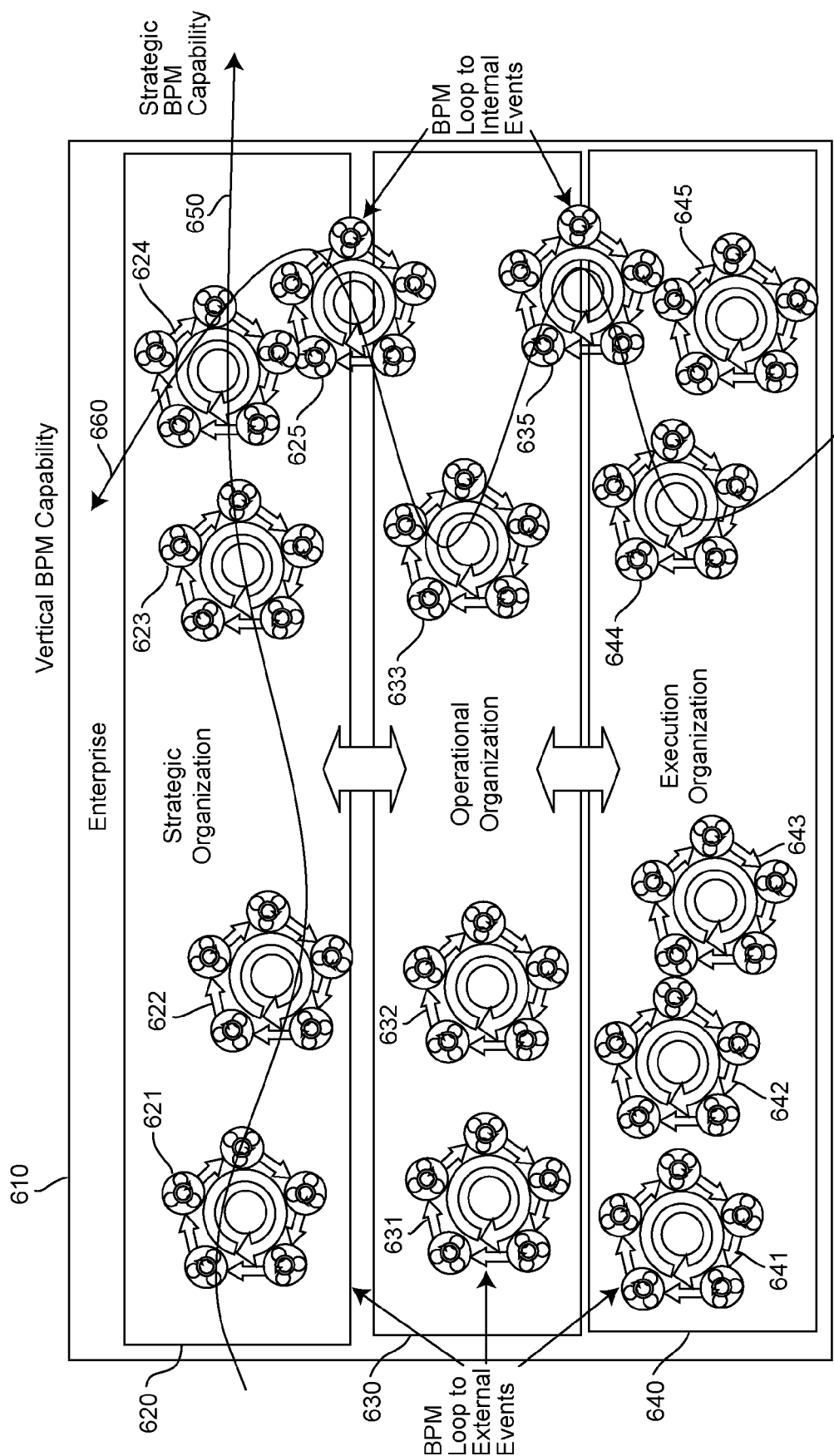
FIG. 6 is a schematic showing strategic, operational and execution levels within an enterprise, together with BMP loops connected to form BMP capabilities horizontally within a level and vertically across levels.
Figure 6A:
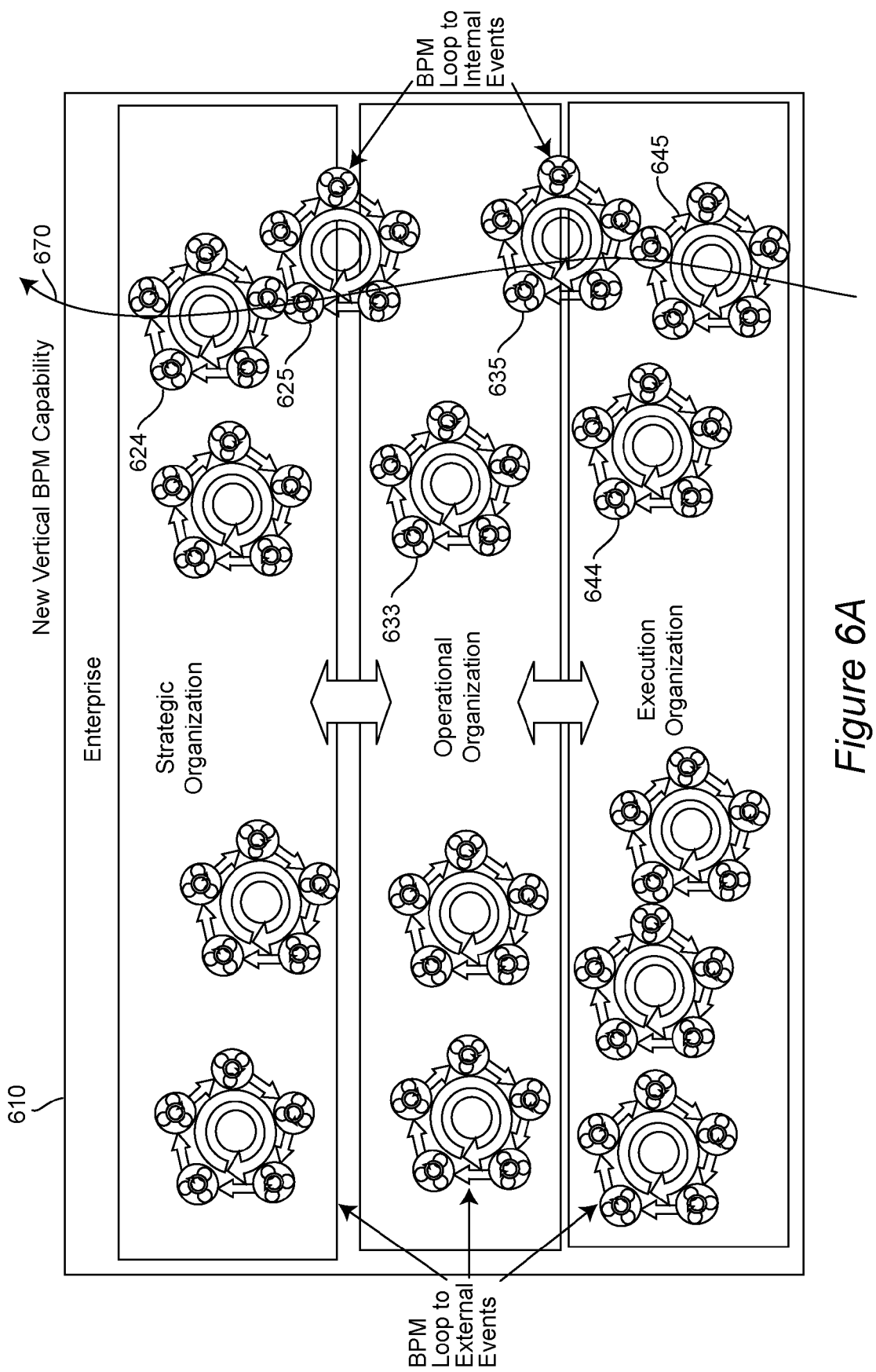
FIG. 6A is the schematic of FIG. 6, modified to show a vertical BMP capability modified by changing the BMP loops comprising the capability.

The execution paths, generated from the BPM net based on constraints and goals defined in the BPM requirement, actually manifest the capabilities of a BPM system for monitoring and controlling business solutions, as will now be shown with reference to FIGS. 6 and 6A. As described above, BPM policies are applied to multiple levels of enterprise abstraction: strategy (implemented by strategic organization 620), operations (implemented by operational organization 630), and execution (implemented by execution organization 640). Each layer consists of corresponding BPM loops that are specialized in monitoring and controlling a specific layer of enterprise resources. For example, strategic layer 620 has its BPM loops (e.g. BPM loops 621, 622, 623, 624 and 625), operational layer 630 has its BPM loops (e.g. BPM loops 631, 632, 633 and 635), and execution layer 640 has its BPM loops (e.g. BPM loops 641, 642, 643, 644 and 645).

Execution paths manifesting BPM capabilities can be defined either horizontally or vertically. A horizontal BPM net capability is an execution path that consists of BPM loops exclusively of a specific layer, e.g. the strategic BPM capability 650 (running through BPM loops 621, 622, 623 and 624). On the other hand, a vertical BPM net capability is an execution path which contains the BPM loops across different layers, e.g. the vertical BPM capability 660 (running through BPM loops 644, 635, 625 and 624). In the diagram, it is also indicated that some BPM loops are for processing external events (e.g. BPM loops 621, 631 and 641) and some for internal events among BPM loops (e.g. BPM loops 625 and 635). The flexibility of the invention is evident from FIG. 6A, which differs from FIG. 6 in showing a new vertical execution path 670, using a slightly different set of BPM loops (i.e. running through BPM loops 645, 635, 625 and 624) as compared to the vertical execution path 660 shown in FIG. 6. As indicated above, candidate execution paths are generated from the BPM net.

Turning again to FIG. 5, it will be observed that new or revised policies may be responsive to changes in business processes 561 of the business solutions 560 covered by BPM net 510, or to management decisions to rely upon different outputs 580 from business processes 561, which outputs may be obtained from probes as described above in the formal definition of BPM nets. These outputs reflect business events of interest in monitoring and controlling the business activity covered by a BPM net, and in turn these business events are represented by a control token 515 that is passed in a particular order around the nodes of a BPM loop in the BPM net. The highly modular nature of BPM loops driven by policies and configured into BPM nets enables the business performance management system to respond dynamically to a volatile business environment.

Figure 9:
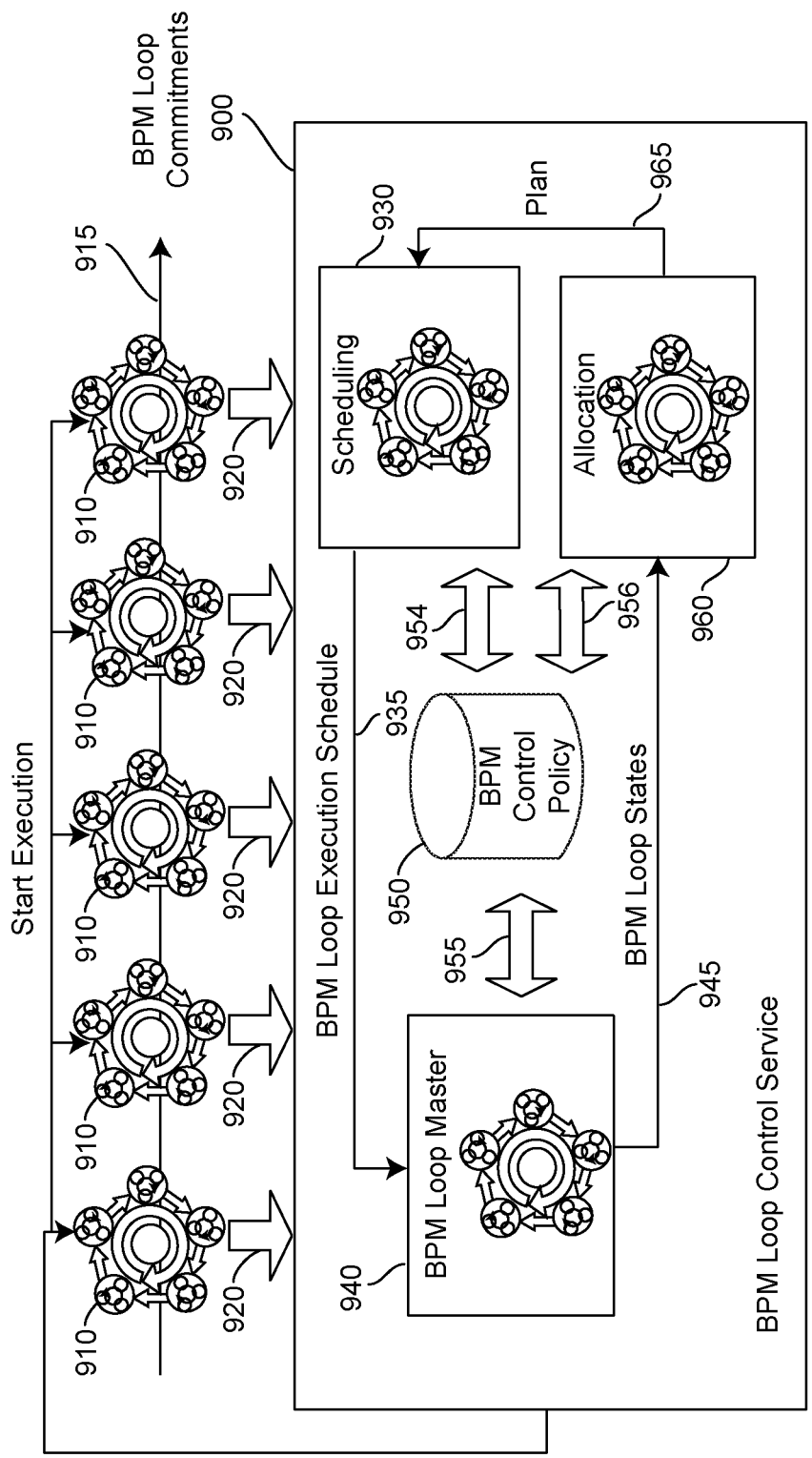
FIG. 9 is a schematic showing how the execution schedule and resource allocation of BPM loops are controlled.

BPMnets are dynamic, being responsive to additional commitments 920 of BPM loops 910 as illustrated in FIG. 9. These commitments arise over time 915 in accordance with or as a consequence of the evaluations and judgments of managers regarding the performance of their business units, enterprises and value chains. In order to incorporate new commitments into BPMnets, BPM loops must be scheduled 930 and appropriate resources must be allocated 960 for execution. All this is done within a BPM loop control service 900 under the direction of a BPM loop master 940 in accordance with BPM control policies 950. A dynamic cycle handles each new commitment 920 as it arises over time 915 by providing a BPM loop execution schedule 935 from the scheduling function 930 to the BPM loop master 940, which in turn defines BPM loop states 945 to the allocation function 960, which returns plan 965 to the scheduling function 930. BPM control policies 950 are applied by the BPM loop master 940 and to the scheduling function 930 and allocation function 960 through communication channels 955, 954 and 956, respectively.

Figure 10:
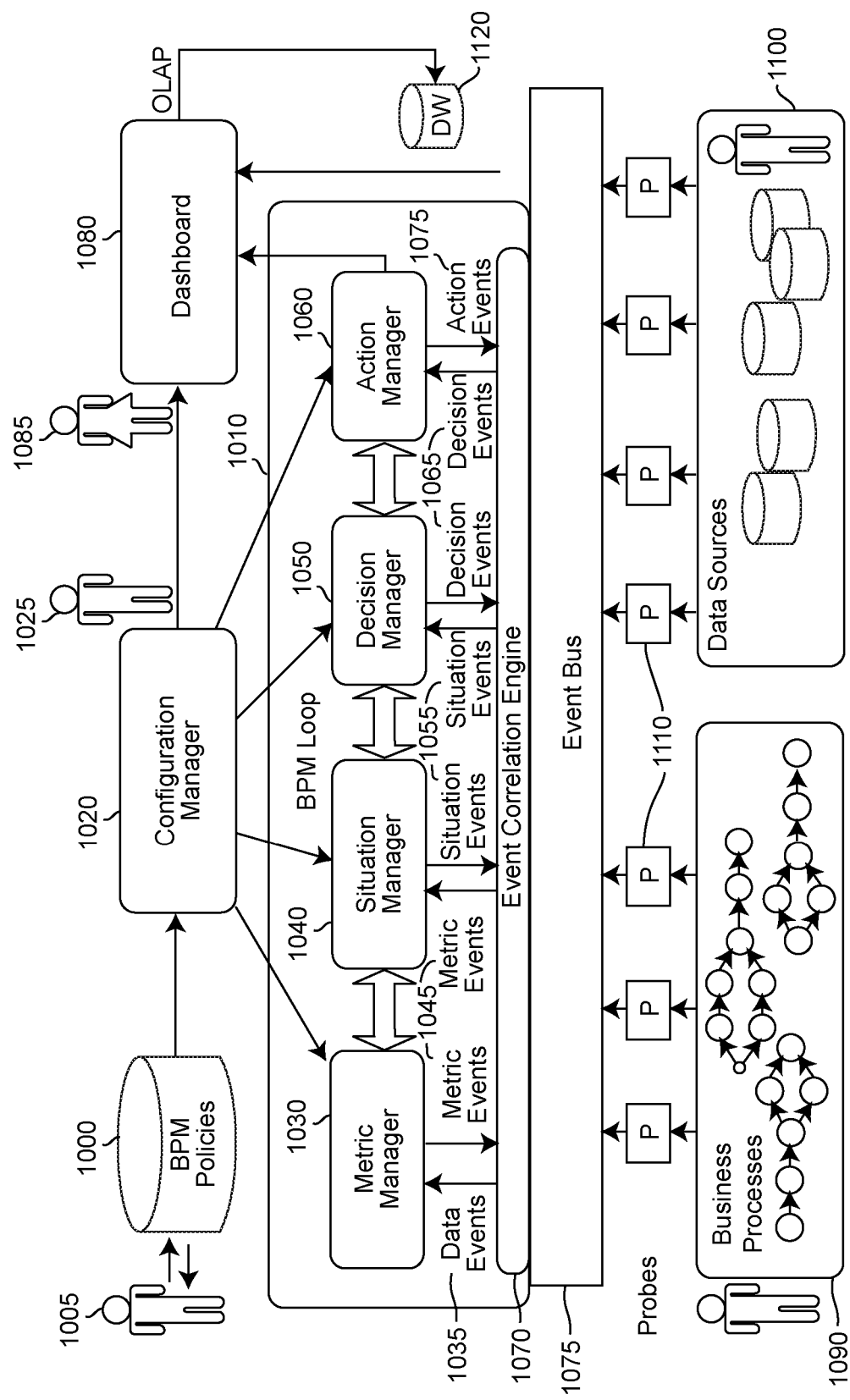
FIG. 10 is a summary diagram showing an implementation of the invention.

An implementation of the invention is shown in FIG. 10, simplified for the purposes of illustration to a single BPM loop 1010. The entire process is driven by BPM policies 1000, which are evaluated and updated by managers 1005. These policies are applied by a configuration manager 1020, whose operation is monitored by managers 1025. In the exemplar BPM loop 1010, there is shown a progression around the loop, using a token (not shown) as a trigger for successive steps in the progression, from a metric manager node 1030 to a situation manager node 1040 to a decision manager node 1050 and to an action manager node 1060. The BPM loop 1010 obtains the information required for its operation via probes 1010 from business processes 1090 and data sources 1100. These are processed through an event bus 1075 and an event correlation engine 1070. Each of the nodes in the BPM loop 1010 has an input and output as describe above with reference to FIG. 3. Data events 1035 provided to the metric manager node 1030 are output as metric events 1045, which serve as input to the situation manager node 1040, which outputs situation events 1055 as input to decision manager node 1050, which outputs decision events 1065 as input to action manager node 1060, which outputs action events 1075 for implementation by business processes 1090. The activity of BPM loop 1010 and event bus 1075 is displayed to managers 1085 on a dashboard 1080, and is stored in a data warehouse 1120 where it is available more widely within the enterprise and value chain via on-line analytical processing (OLAP).

A policy-driven BPM system makes it adaptive to monitor and control business solutions, which is particularly useful for a domain with high volatility of monitoring and control requirements. Crystallization of BPM policies into BPM loops and BPM net increases the modularity and reusability of BPM policies and consequently the system behavior. Formalization of BPM nets allows the dynamic formation of service execution and hence makes the system of BPM loops and BPM nets an on-demand monitoring and control system. The formal model of BPM nets also allows optimization of the execution of BPM nets based on given constraints and cost bounds. Usually, the monitoring and control applications for a specific business solution such as supply chain management systems are defined in an ad-hoc and static manner. A BPM solution is bound with a set of services at design time, which realizes the early binding of BPM policies with the underlying policy architecture. However, in an on-demand environment, the binding is not possible until the policies are discovered and enforced at run time.

There are benefits and disadvantages on either approach. Early bindings motivates the analysts to assess the policy needs at design time and rely on these early decisions for an efficient implementation at run time. On the other hand, late bindings enable high flexibility of policy bindings with the policy architecture such as execution paths. Therefore, more adaptive BPM functionality can be enabled via policies.

This invention describes a system and method of building an adaptive BPM policy architecture for managing business solutions. The system is designed, keeping in mind the need for multiple levels of abstraction, various types of services, and different types of collaboration so that not only can BPM tasks be quickly assembled and executed, but the configuration data can be deployed to the system dynamically. The dynamic interactions among services are captured in the BPM net in response to business situations that are detected from the set of observed or simulated metrics in the target business solutions. The BPM net model allows the composition of BPM services and resources using policies.

While the invention has been described in terms of preferred embodiments, those skilled in the art will recognize that the invention can be practiced with modification within the spirit and scope of the appended claims.

Having thus described our invention, what we claims as new and desire to secure by Letters Patent is as follows:

1. A method for business performance management (BPM) of a business unit defined by business processes, and in the method using one or more automated tokens, each of which represents a business event from one of said business processes, the method comprising the steps of:

operating a BPM Net comprising a plurality of BPM loops wherein a BPM loop comprises a plurality of nodes, said plurality of nodes including at least a sensing node for receipt via said tokens of event data corresponding to said business event and an execution node for sending action data to a business unit for implementation in response to said business event;

storing in a database one or more policies which govern transformation by said nodes of said event data into said action data, passing each of said tokens sequentially from node to node in a particular order around said BPM loop, beginning with said sensing node and ending with said execution node, application of a policy at a node being triggered by said token, each said node further comprising a data acquisition element for acquiring data from another node, a data processing element for transforming data in accordance with one of said policies, and a data output element for transmitting data to another node, receiving said event data, wherein said event data is received by said sensing node in real time, transforming said event data, wherein said policies transform said event data in real time, and sending said action data wherein said action data is sent to said business unit in real time wherein the method steps are performed by an automated BPM system that comprises a BPM loop architecture that comprises a physical star and a data processing ring;

practiced for continuous demand-driven build plan and inventory optimization in microelectronic manufacturing, comprising steps performed by the BPM system of:

receiving events from various source systems from a supply chain;

continuously updating actual revenue, revenue outlook and inventory levels;

determining whether progression of accrued revenue is normal or below target, and when a below-target situation exists, automatically detecting the below-target situation and issuing an alert showing current sales quantities of some selected saleable part numbers in an nth week are out of bands for said part numbers;

recommending to adjust planned demand quantities and safety stock requirements for the nth week;

invoking a demand planning module and inventory planning module to analyze demand quantities and safety stock requirements for the nth week;

after suggestions of the BPM system have been looked at by a business line manager, revising an actual build plan into an updated build plan;

continuing monitoring with the updated build plan.

2. The method of claim 1, including processing multiple input requests concurrently wherein the processing is performed by a node having multiple instances of input and output links.

3. The method of claim 1, wherein the BPM system comprises:

a dispatching module that is a Multi Node Access Unit, the Multi Node Access Unit being connected to a set of BPM loop nodes; wherein each BPM node on a BPM loop is both a data trans-former and a repeater;

wherein the physical star comprises several Multi Node Access Units connected in one BPM node while BPM links connect the Multi Node Access Units to the BPM nodes.

4. A method as in claim 1, further comprising:

operating at least a second BPM loop wherein a token received by a sensing node in said second BPM loop is received from a data output element of a node in a first other BPM loop, and sending action data from an execution node in said second BPM loop to a data input element of a node in a second other BPM loop, said token representing an event within said first other BPM loop and said action data from said second BPM loop being a commitment of said second BPM loop to said first other BPM loop.

5. A method as in claim 4, further comprising the step of operating a plurality of BPM loops for a plurality of business units, said plurality of BPM loops being connected by one or more commitments to form an enterprise.

6. A method as in claim 5, further comprising the step of connecting a plurality of enterprises by one or more commitments to form a value chain.

7. A method as in claim 5, wherein said plurality of BPM loops includes different pluralities for different levels of said enterprise, said different levels including a strategic organization, an operational organization, and an execution organization.

8. A method as in claim 7, wherein said plurality of BPM loops includes at least one vertical plurality having BPM loops from each of said different levels of said enterprise.

9. A method as in claim 8, wherein said vertical plurality is dynamically adapted responsive to changes in one or more of said policies, said changes resulting in adding or removing at least one BPM loop.

* * * * *